US012704075B1

(12) United States Patent
Banhos et al.

(10) Patent No.: US 12,704,075 B1
(45) Date of Patent: Aug. 11, 2026

(54) CERAMIC MATRIX COMPOSITE BLADE OUTER AIR SEAL SEGMENT USING PRE-DENSIFIED TUBES AND METHOD THEREOF

(71) Applicant: RTX CORPORATION, Farmington, CT (US)

(72) Inventors: Jonas Banhos, West Hartford, CT (US); James T Roach, Vernon, CT (US); Russell Kim, Temecula, CA (US); Raymond Surace, Newington, CT (US); Howard J Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/098,329

(22) Filed: Apr. 2, 2025

(51) Int. Cl.
*F01D 11/08* (2006.01)

(52) U.S. Cl.
CPC .......... *F01D 11/08* (2013.01); *F05D 2230/22* (2013.01); *F05D 2230/314* (2013.01); *F05D 2240/11* (2013.01); *F05D 2300/6033* (2013.01)

(58) Field of Classification Search
CPC ................. F01D 11/08; F05D 2230/22; F05D 2230/314; F05D 2240/11
See application file for complete search history.

(56) References Cited

U.S. PATENT DOCUMENTS

| | | | | |
|---|---|---|---|---|
| 10,801,351 | B2 * | 10/2020 | Rugg | F01D 9/023 |
| 11,359,507 | B2 * | 6/2022 | Fernandez | C04B 35/565 |
| 11,578,609 | B2 * | 2/2023 | Clark | F01D 11/08 |
| 11,879,351 | B2 | 1/2024 | Kim et al. | |
| 12,018,568 | B2 | 6/2024 | Clark et al. | |
| 2020/0095880 | A1 * | 3/2020 | Clark | F01D 11/08 |

* cited by examiner

*Primary Examiner* — Nathaniel E Wiehe
*Assistant Examiner* — Jason G Davis
(74) *Attorney, Agent, or Firm* — Christopher B. Kilner; MILLEN, WHITE, ZELANO & BRANIGAN, P.C.

(57) ABSTRACT

A ceramic matrix composite (CMC) blade outer air seal (BOAS) segment includes a preform having a base layup formed of one or more fabric plies folded to form a first rib portion, a shoe portion having an upstream fold edge and a downstream fold edge, and a second rib portion. One or more pre-densified CMC tubes are disposed circumferentially between the first rib portion and the upstream fold edge and between the second rib portion and the downstream fold edge, respectively. An outer wrap formed of one or more fabric plies is disposed to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion.

14 Claims, 9 Drawing Sheets

CERAMIC MATRIX COMPOSITE BLADE OUTER AIR SEAL SEGMENT USING PRE-DENSIFIED TUBES AND METHOD THEREOF

FIELD OF THE INVENTION

The subject matter disclosed herein relates to ceramic matrix composite (CMC) blade outer air seal (BOAS) and, in particular, to a CMC BOAS segment having a preform that employs pre-densified tubes that are sandwiched between folded and wrapped plies.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (i.e., gaspath components). Therefore, it is desirable that such components be made of heat-resistant materials such as ceramic matrix composites (CMCs), which can withstand much higher operating temperatures than components composed of metal superalloys. Silicon Carbide (SiC) based CMCs fabricated via Chemical Vapor Infiltration (CVI), Melt Infiltration (MI), Polymer Infiltration and Pyrolysis (PIP), and hybrids of CVI/MI and CVI/PIP possess such high temperature capability. Such CMC components are typically fabricated from a near-net shape fiber preform, typically formed from fabric and tow layups.

A blade outer air seal (BOAS, sometimes referred to as a blade shroud or cooled shroud) contributes to the hot flow path by maintaining a flow boundary at the radially outermost surface. A CMC BOAS may be formed of segments that are circumferentially distributed, which may also include slot seals between segments. A full CMC BOAS segment layup may be constructed with a common bottom-top layup approach, wherein plies are stacked at a bottom, inner diameter (ID) portion of the BOAS segment and mated to plies arranged at a top, outer diameter (OD) portion of the BOAS segment, which typically includes attachment features of the CMC BOAS segment.

CMC BOAS segments may be internally cooled by compressor bleed or discharge air. The cooling air may pass through passageways in the seal body and exit outlet ports in the inboard or inner diameter (ID) side of the body (typically to provide film cooling the ID face). Air may also exit along the circumferential ends (mate faces) of the CMC BOAS segments to be vented into the adjacent inter-segment region (e.g., to help cool feather seal segments sealing the adjacent CMC BOAS segments and prevent ingestion of hot gaspath air).

The thermal gradient within a CMC BOAS segment is mostly vertical (engine radial), which may create distortions within the part (e.g., “potato-chipping” and other warping). Furthermore, stresses within CMC BOAS segments are mostly induced by thermal gradients, but may also have a pressure contribution.

Accordingly, it would be beneficial to develop shapes and/or layup configurations for CMC BOAS segments that can provide a better bending response and/or better thermal pathways to minimize stresses.

The above information disclosed in this Background section is only for understanding of the background of the inventive concepts and, therefore, it may contain information that does not constitute prior art.

SUMMARY OF THE INVENTION

The present disclosure is directed, in a first aspect, to a ceramic matrix composite (CMC) blade outer air seal (BOAS) segment. The CMC BOAS segment includes a preform having: a base layup formed of one or more fabric plies folded to form a first rib portion, a shoe portion having an upstream fold edge and a downstream fold edge, and a second rib portion; one or more pre-densified CMC tubes disposed circumferentially between the first rib portion and the upstream fold edge and between the second rib portion and the downstream fold edge, respectively; and an outer wrap formed of one or more fabric plies disposed to over-wrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion.

In an embodiment of the CMC BOAS segment, ends of the base layup may include L-shaped cuts to allow the ends to intersect and form a substantially U-shaped cross section forming the first and second rib portions.

In another embodiment of the CMC BOAS segment, the preform may further include a substantially U-shaped layup formed of one or more fabric plies disposed circumferentially between the first rib portion and the second rib portion.

In a further embodiment of the CMC BOAS segment, the preform may be densified by Chemical Vapor Infiltration (CVI), Melt Infiltration (MI), Polymer Infiltration and Pyrolysis (PIP), a hybrid of CVI/MI, or a hybrid of CVI/PIP.

In yet another embodiment of the CMC BOAS segment, the pre-densified CMC tubes may have flattened non-circular cross sections.

In an embodiment of the CMC BOAS segment, one or more holes may be formed to extend from the base layup between the first and second ribs to an interior of one of the pre-densified tubes.

In another embodiment of the CMC BOAS segment, an end of one or more of the pre-densified tubes may be sealed.

In a further embodiment of the CMC BOAS segment, the one or more pre-densified tubes may be circumferentially offset relative to the base layup and the outer wrap.

In yet another embodiment of the CMC BOAS segment, the CMC BOAS segment may make up one sixth of a CMC BOAS wheel.

The present disclosure is also directed, in a second aspect, to a method of forming a ceramic matrix composite (CMC) blade outer air seal (BOAS) segment. The method includes forming a preform by: folding a base layup formed of one or more fabric plies to form a first rib portion, a shoe portion having an upstream fold edge and a downstream fold edge, and a second rib portion; disposing one or more pre-densified CMC tubes circumferentially between the first rib portion and the upstream fold edge and between the second rib portion and the downstream fold edge, respectively; and disposing an outer wrap formed of one or more fabric plies to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion.

In an embodiment of the method, ends of the base layup may include L-shaped cuts and the method may further include intersecting the L-shaped cuts to form a substantially U-shaped cross section forming the first and second rib portions.

In another embodiment, the method may further include disposing a substantially U-shaped layup formed of one or more fabric plies circumferentially between the first rib portion and the second rib portion.

In a further embodiment, the method may further include densifying the preform by Chemical Vapor Infiltration (CVI), Melt Infiltration (MI), Polymer Infiltration and Pyrolysis (PIP), a hybrid of CVI/MI, or a hybrid of CVI/PIP.

In yet another embodiment of the method, forming the preform may further include forming one or more holes extending through the base layup between the first and second ribs to an interior of one of the pre-densified CMC tubes.

In an embodiment of the method, at least one end of at least one of the pre-densified CMC tubes may be sealed prior to being disposed circumferentially.

In another embodiment of the method, at least one end of at least one of the pre-densified CMC tubes may be blocked with fabric layup and sealed during the densifying of the preform.

In a further embodiment of the method, disposing the one or more pre-densified CMC tubes circumferentially may include offsetting the pre-densified CMC tubes relative to the base layup and the outer wrap.

The present disclosure is further directed, in a third aspect, to another method of forming a ceramic matrix composite (CMC) blade outer air seal (BOAS) segment that includes forming a preform and densifying the preform. Forming the preform includes: folding a base layup formed of one or more fabric plies to form a first rib portion, a shoe portion having an upstream fold edge and a downstream fold edge, and a second rib portion; disposing one or more pre-densified CMC tubes having sealed ends circumferentially between the first rib portion and the upstream fold edge and between the second rib portion and the downstream fold edge, respectively, wherein the pre-densified CMC tubes have flattened non-circular cross sections; disposing an outer wrap formed of one or more fabric plies to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion; and forming one or more holes extending through the base layup between the first and second ribs to an interior of one of the pre-densified CMC tubes. Densifying the preform is done by Chemical Vapor Infiltration (CVI), Melt Infiltration (MI), Polymer Infiltration and Pyrolysis (PIP), a hybrid of CVI/MI, or a hybrid of CVI/PIP.

In an embodiment of this method, ends of the base layup may include L-shaped cuts and the forming the preform may further include intersecting the L-shaped cuts to form a substantially U-shaped cross section forming the first and second rib portions.

In another embodiment of this method, forming the preform may further include disposing a substantially U-shaped layup formed of one or more fabric plies circumferentially between the first rib portion and the second rib portion.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
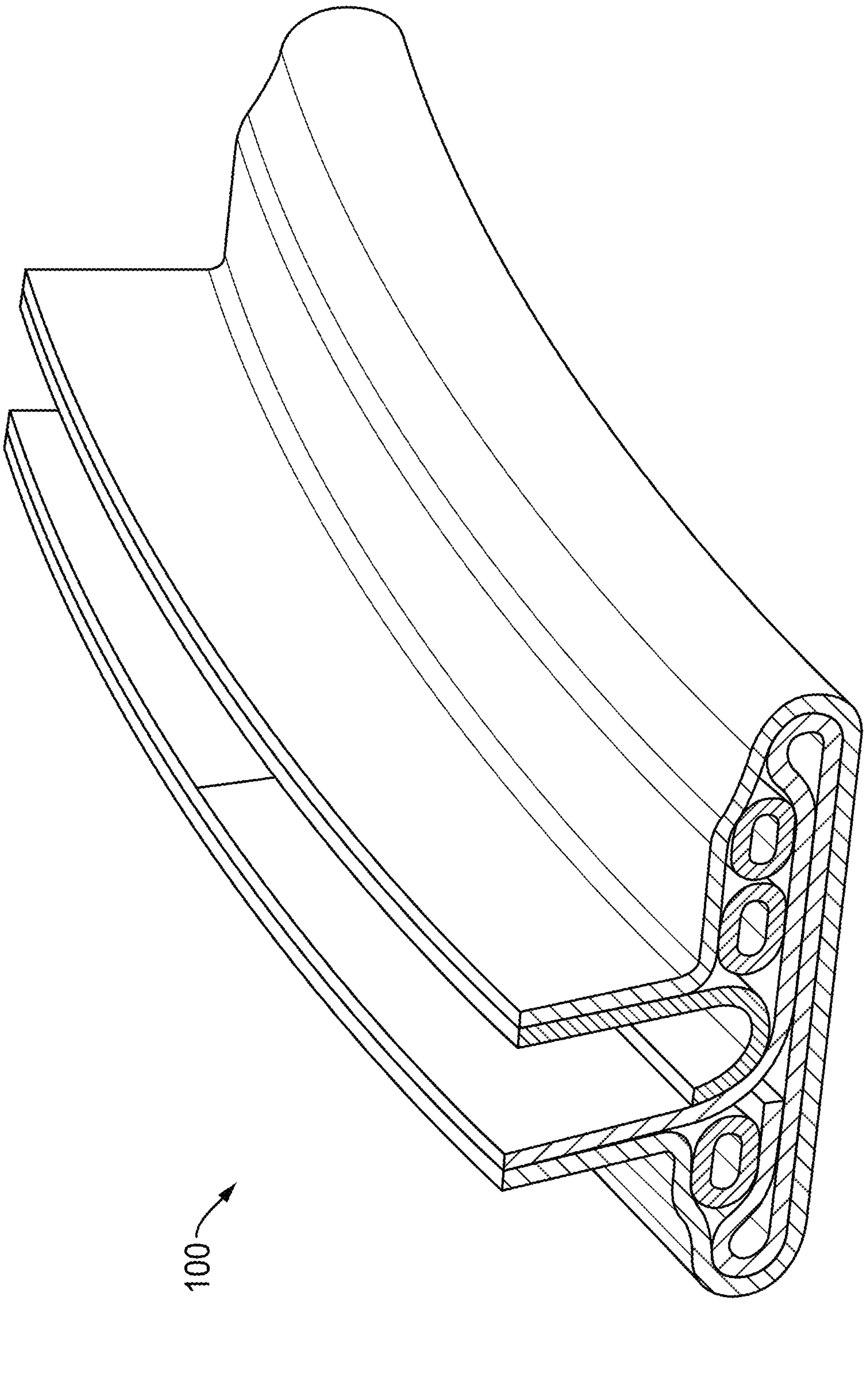
FIG. 1 schematically illustrates a perspective view of an example BOAS segment or preform thereof in accordance with the present disclosure.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to a CMC BOAS segment or preform thereof using a shape or layup configuration that may provide better bending response or thermal pathways so as to reduce or minimize stresses. The more organic shape of the CMC BOAS segments disclosed herein may allow for a sandwich-structure bending response that resists warping, better densification pathways, and tube-based cooling schemes.

In accordance with the present disclosure, a separate outer wrap ply surrounds a sandwich structure formed with pre-densified CMC tubes and a folded base layup. The CMC tube structures can be pre-densified and placed along the flanges formed with rib portions so as to act as a primary core material. The base layup is created using a folding technique to maintain fiber continuity. A higher moment of inertia is created locally at outer longitudinal fold edges based upon how the base layup is folded. In the folded configuration, continuous plies of the base layup can form opposing sides of rib portions used to form the flanges of the CMC BOAS segment.

While the illustrated examples and discussion below often make reference to a CMC BOAS segment, it should be recognized that the present disclosure is not limited to completed components, but includes associated preforms as well. Accordingly, references to a CMC BOAS segment may include the preform thereof, dependent on the context.

In the discussion below, axial refers to a direction that coincides with the longitudinal axis of a gas turbine engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream.

FIG. 1 schematically illustrates a perspective view of a first embodiment of a BOAS segment 100 (or preform thereof) in accordance with the present disclosure. FIGS. 2A, 2B, 2C, and 2D schematically illustrate examples of the various components and their incorporation together to form the CMC BOAS segment 100 of FIG. 1.

Figure 2A:
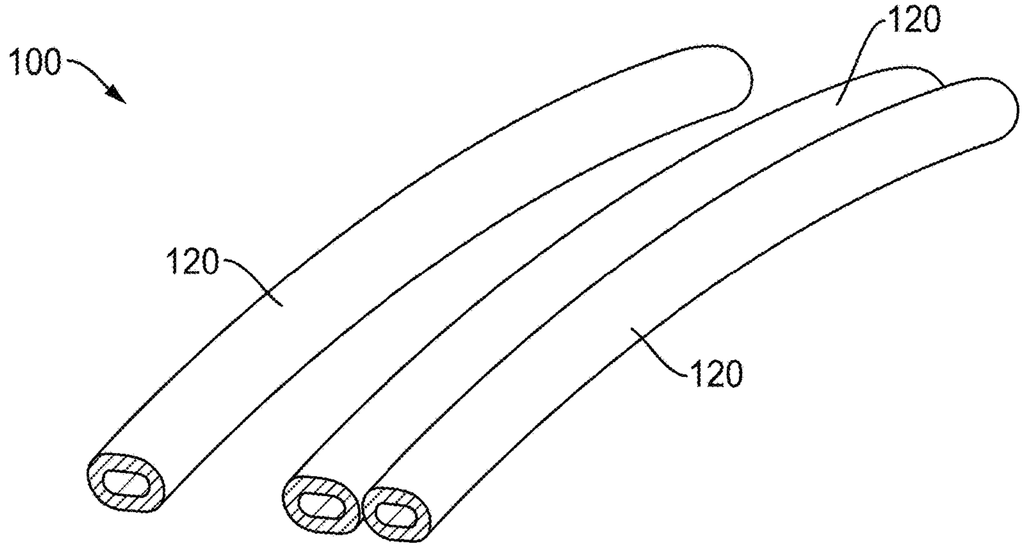
FIG. 2A schematically illustrates a perspective view of an example set of pre-densified CMC tubes in accordance with the present disclosure.

Referring to FIG. 2A, a perspective view of an example set of pre-densified CMC tubes 120 in accordance with an embodiment of the present disclosure is illustrated. The pre-densified CMC tubes 120 extend in a curved manner with a radius corresponding to their ultimate circumferential position within the CMC BOAS segment 100 making up part of the BOAS of the engine.

The cross-sectional shape of the pre-densified CMC tubes 120 may be circular or non-circular and in the present example are an ovalized or flattened shape that permits additional surface contact with other portions of the CMC BOAS segment 100. While it may be beneficial to have the height of the pre-densified CMC tubes 120 be uniform for overall shaping of the CMC BOAS segment 100, it may also be beneficial to vary a width between the pre-densified CMC tubes 120 to achieve desired dimensions of the CMC BOAS segment 100.

The pre-densified CMC tubes 120 may be formed, for example, by wrapping a SiC ply multiple times around a mandrel to form a tube preform, and then densifying the tube preform using CVI, MI, PIP, and hybrids thereof.

Further, while illustrated with open ends, one or more of the pre-densified CMC tubes 120 may have one or both of their ends closed, so as to form a plenum or conduit for cooling air. When the ends are closed, the closed ends may be part of the pre-densified CMC tubes 120, or open ends of the pre-densified CMC tubes 120 may be filled or blocked with layup material and sealed/closed during a densification process.

Figure 2B:
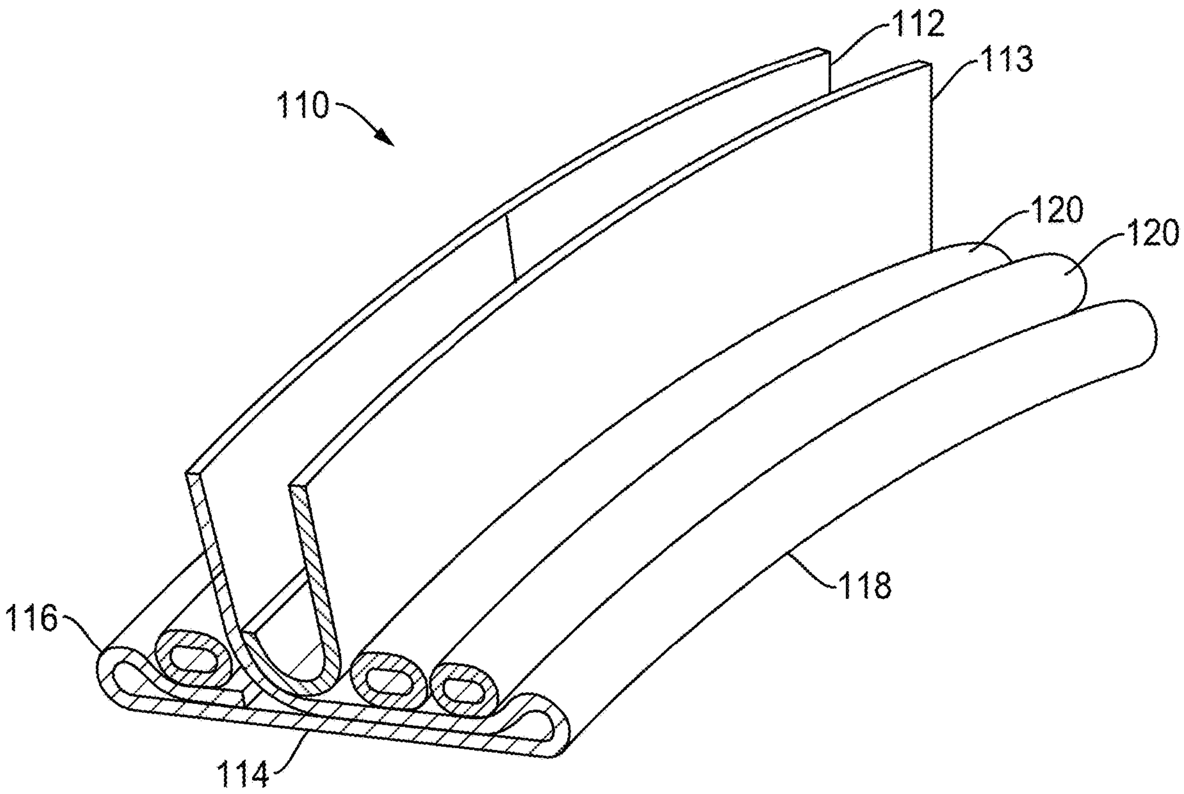
FIG. 2B schematically illustrates a perspective view of an example of a folded base layup with the pre-densified CMC tubes disposed circumferentially thereon in accordance with the present disclosure.

With reference to FIG. 2B, the pre-densified CMC tubes 120 may be used in assembling a preform for the CMC BOAS segment 100. The pre-densified CMC tubes 120 may be disposed circumferentially on a base layup 110 formed of one or more fabric plies folded to form a first rib portion 112, a shoe portion 114 having an upstream fold edge 116 and a downstream fold edge 118, and a second rib portion 113 in accordance with one or more embodiments of the present disclosure. In one or more embodiments, base layup 110 may be formed of 8-12 plies held together with beeswax or a tackifier such as polyvinyl acetate (PVA) or polyvinyl butyral (PVB). The inner-diameter surface of shoe portion 114 may be flat and extend in a curved manner with a radius corresponding to the ultimate circumferential position within the CMC BOAS segment 100 making up part of the BOAS wheel of the engine.

One or more of the pre-densified CMC tubes 120, one in the illustrated embodiment, may thus be disposed circumferentially between the first rib portion 112 and the upstream fold edge 116. Additionally, one or more of the pre-densified CMC tubes 120, two in the illustrated embodiment, may be disposed circumferentially between the second rib portion 113 and the downstream fold edge 118.

Figure 2C:
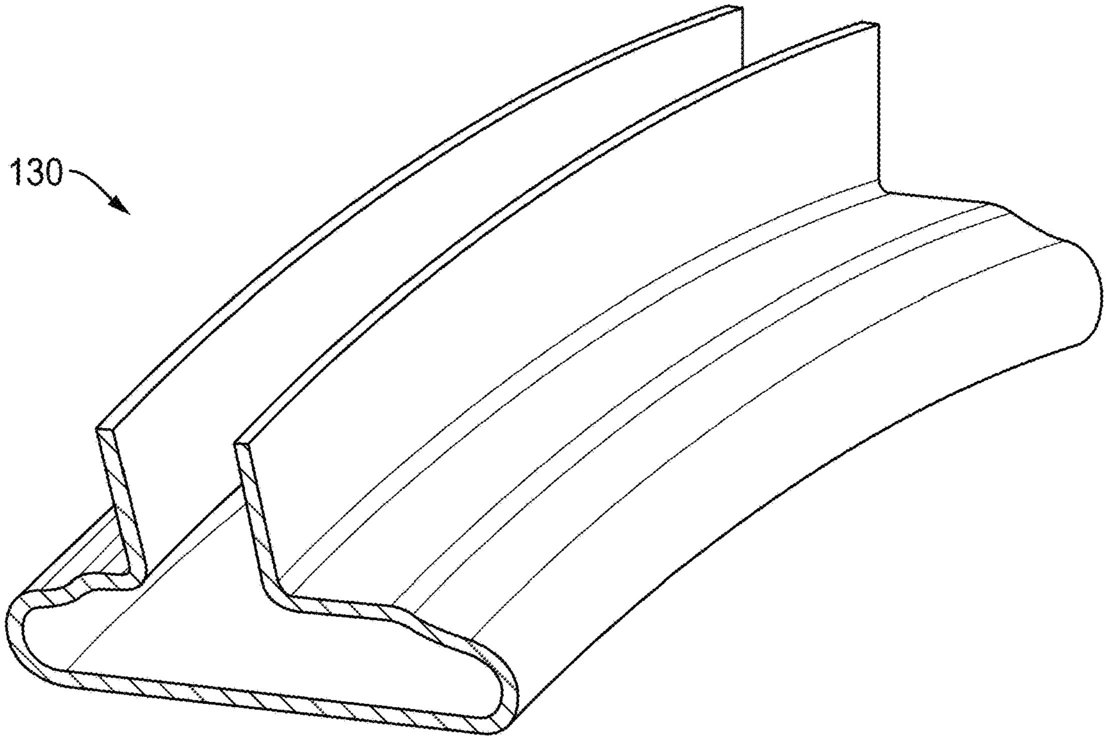
FIG. 2C schematically illustrates a perspective view of an example outer wrap in accordance with the present disclosure.
Figure 2D:
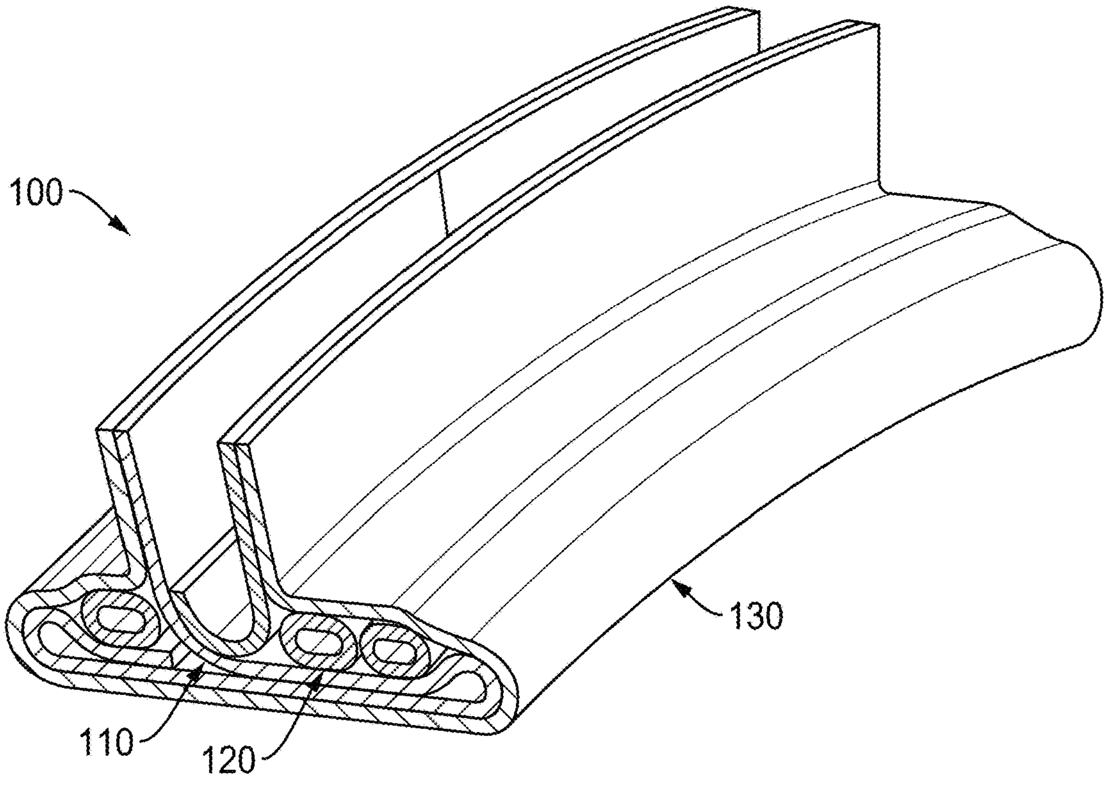
FIG. 2D schematically illustrates a perspective view of an example CMC BOAS segment preform or densified part in accordance with the present disclosure.

FIG. 2C schematically illustrates a perspective view of an embodiment of an outer wrap 130 in accordance with the present disclosure. The outer wrap 130 is formed of one or more fabric plies, and as illustrated by FIGS. 2B and 2D, is disposed to overwrap the first rib portion 112, the one or more pre-densified CMC tubes 120 disposed circumferentially between the first rib portion 112 and the upstream fold edge 116, the upstream fold edge 116, the downstream fold edge 118, the one or more pre-densified CMC tubes 120 disposed circumferentially between the second rib portion 113 and the downstream fold edge 118, and the second rib portion 113.

Figure 3A:
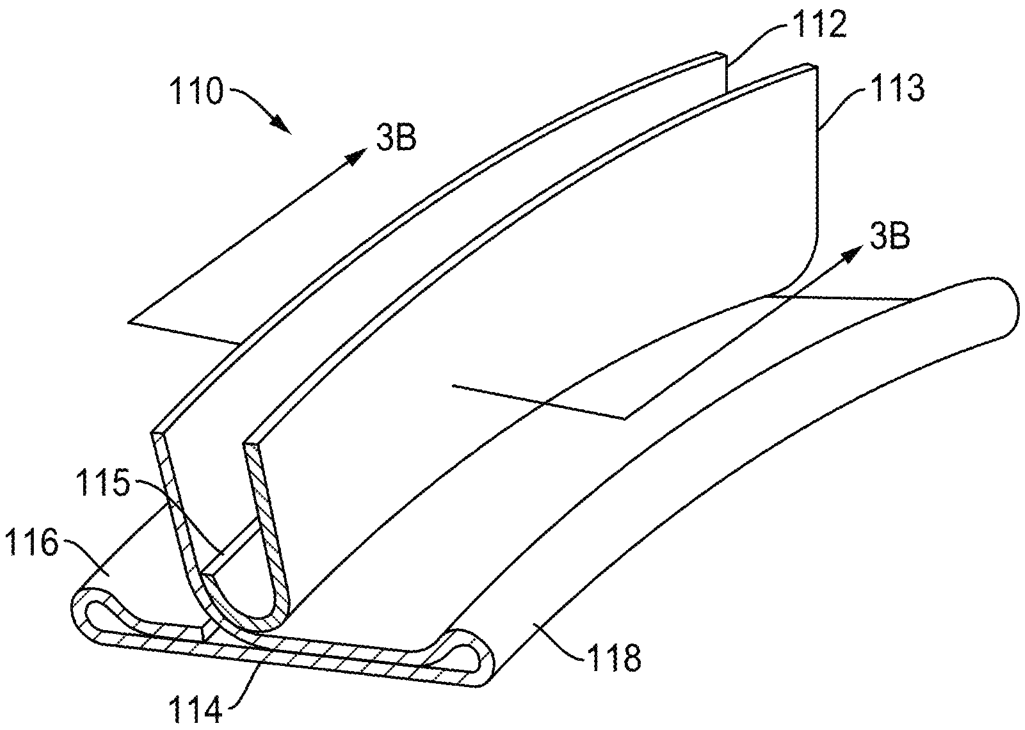
FIG. 3A schematically illustrates a first perspective view of an example of a folded base layup in accordance with the present disclosure.
Figure 3B:
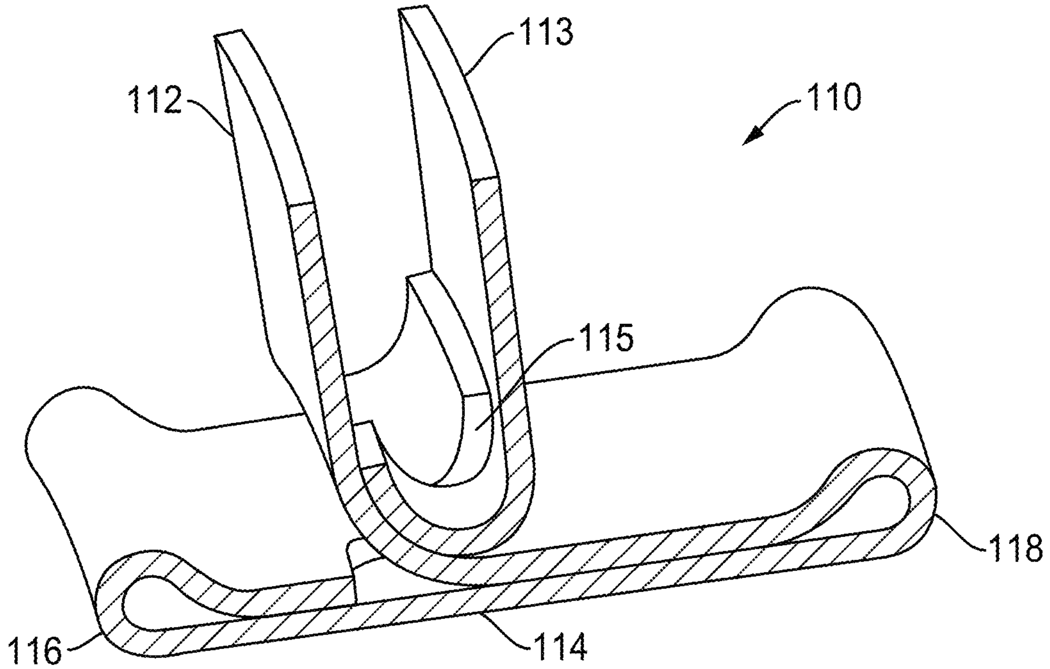
FIG. 3B schematically illustrates a second perspective view of a cross section of the example folded base layup of FIG. 3A in accordance with the present disclosure.
Figure 3C:
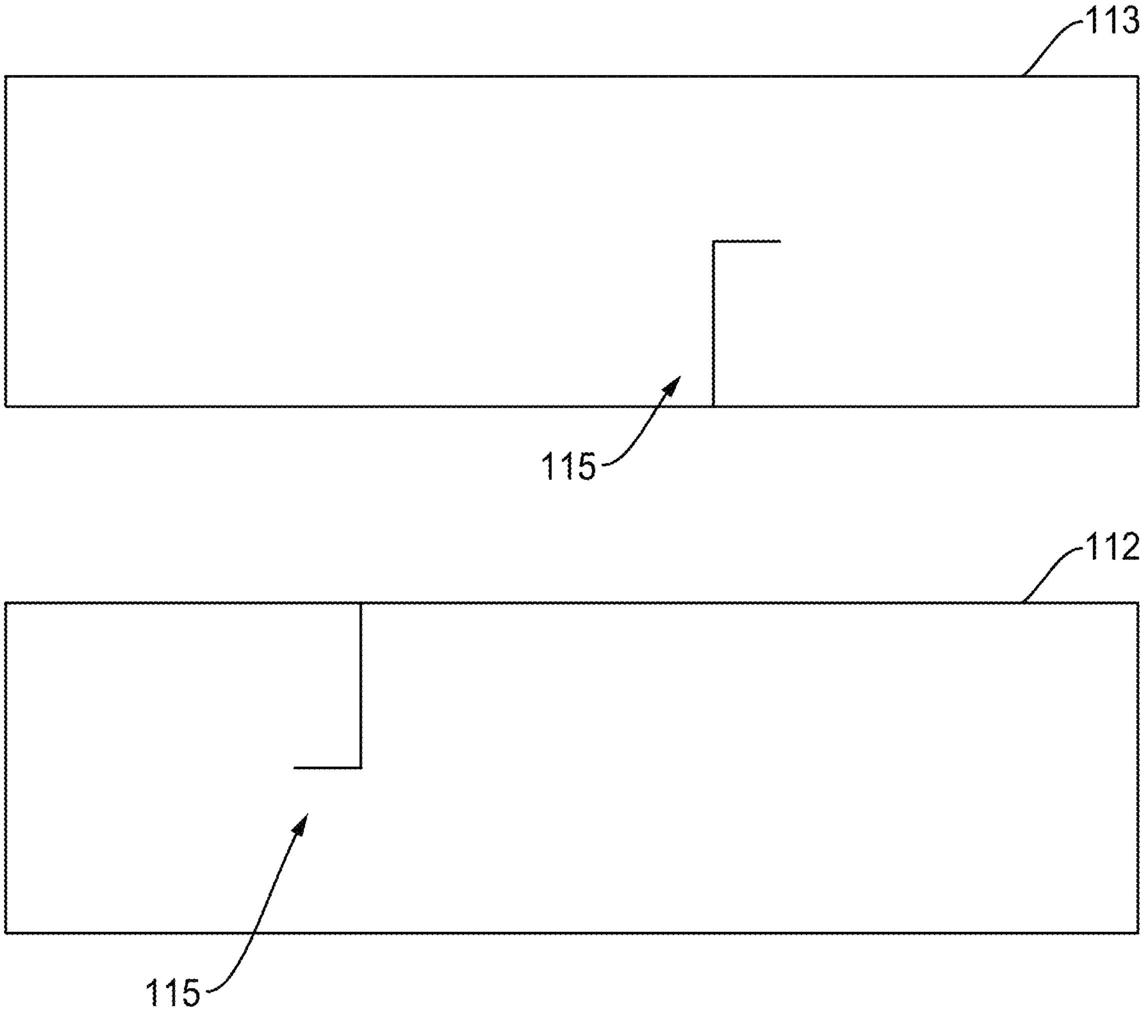
FIG. 3C schematically illustrates a plan view of an example of ends of the base layup in an unfolded condition and cuts therein in accordance with the present disclosure to permit the folding illustrated in FIGS. 3A and 3B.

With reference to FIGS. 3A and 3B, various perspective views of an embodiment of a folded base layup 110 in accordance with the present disclosure are illustrated, with a cross section of FIG. 3A illustrated in FIG. 3B. FIG. 3C schematically illustrates a plan view of the ends of the base layup prior to folding and the cuts 115 made therein in accordance with the present disclosure to permit the folding illustrated in FIGS. 3A and 3B.

In the embodiment of FIGS. 3A, 3B, and 3C, the base layup 110 may start flat (albeit with an inner-side radius corresponding to an ultimate circumferential position within the CMC BOAS segment 100 making up part of the BOAS wheel of the engine), and forms a shoe portion 114 by being folded inward on an upstream side to form upstream fold edge 116 and folded inward on a downstream side to form downstream fold edge 118. The inward folded portions of base layup 110 are then interleaved with each other using respective cuts 115 and then bent upwards to form first rib portion 112 and second rib portion 113. The bend radius of the upstream fold edge 116 and downstream fold edge 118 may be limited based upon the allowable bend radius of the one or more fabric plies making up the base layup 110.

As illustrated most clearly in FIGS. 3B and 3C, the cuts 115 may be L-shaped such that a flap formed by the L-shape of each cut 115 may be disposed along at least a portion of each of the lower bends of the first and second rib portions 112 and 113. The included L-shaped cuts 115 allow the ends to intersect and form a substantially U-shaped cross section forming the first rib portion 112 and the second rib portion 113. This arrangement improves ply connectivity and provides additional area of interlaminar contact for increased strength and stiffness.

Figure 4:
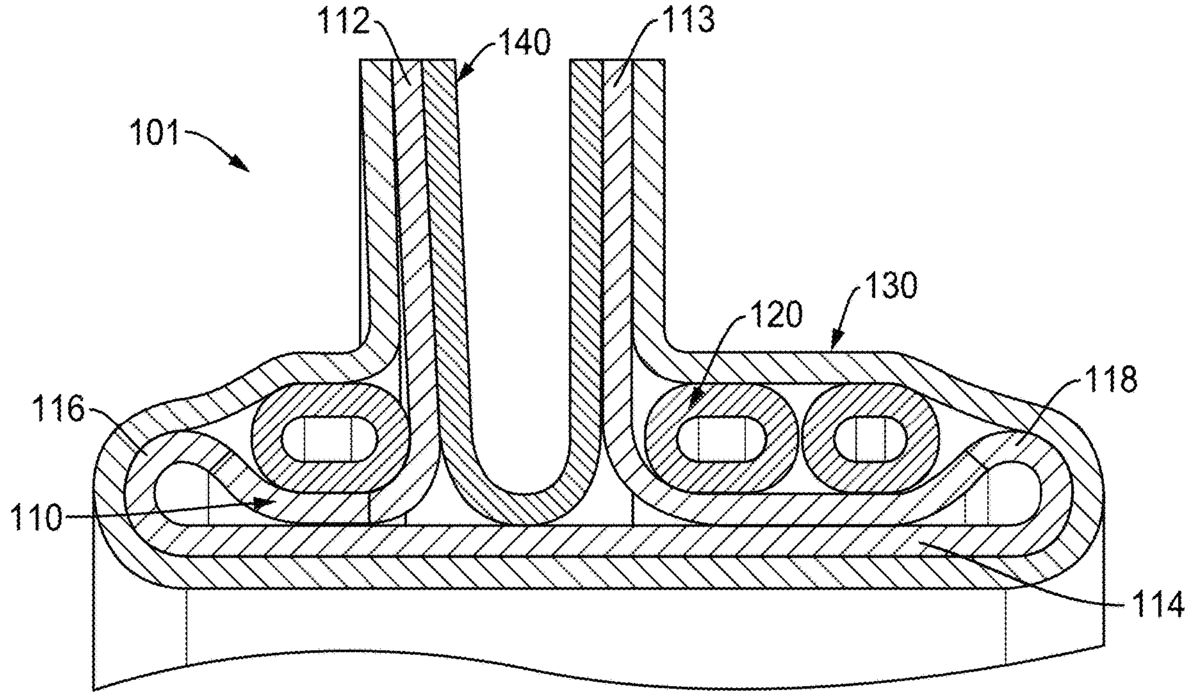
FIG. 4 schematically illustrates a perspective view of another example of a CMC BOAS segment or preform thereof in accordance with the present disclosure.

FIG. 4 schematically illustrates a perspective view of another embodiment of a CMC BOAS segment 101 (or preform thereof) in accordance with the present disclosure.

Like the CMC BOAS segment 100 of FIGS. 1-3C, CMC BOAS segment 101 includes a base layup 110 formed of one or more fabric plies folded to form a first rib portion 112, a shoe portion 114 with an upstream fold edge 116 and a downstream fold edge 118, and a second rib portion 113. CMC BOAS segment 101 further includes pre-densified CMC tubes 120 and an outer wrap 130 formed of one or more fabric plies disposed to overwrap. However, in the embodiment of CMC BOAS segment 101, the base layup 110 does not include the cuts and the ends do not intersect.

Rather, in the embodiment of FIG. 4, the CMC BOAS segment 101 further includes a substantially U-shaped layup 140 formed of one or more fabric plies and disposed circumferentially between the first rib portion 112 and the second rib portion 113.

Figure 5:
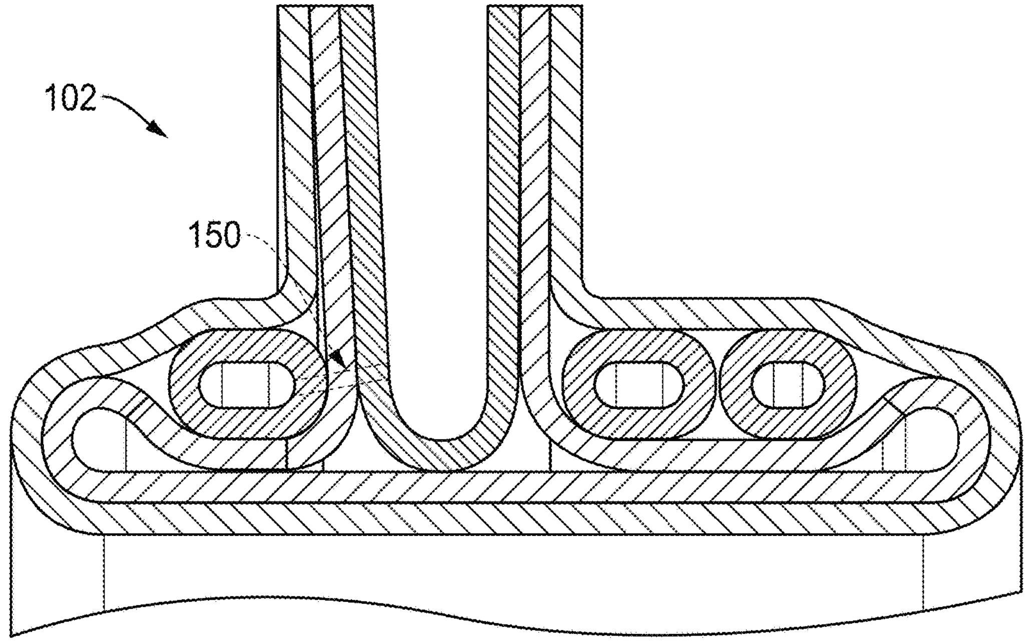
FIG. 5 schematically illustrates a perspective view of a further example of a CMC BOAS segment or preform thereof in accordance with the present disclosure.

FIG. 5 schematically illustrates a perspective view of a further example of a CMC BOAS segment 102 (or preform thereof) in accordance with the present disclosure. In this embodiment, the CMC BOAS segment 102 is substantially the same as the embodiment of CMC BOAS segment 101 in FIG. 4 (with reference numerals omitted for clarity), but CMC BOAS segment 102 further includes one or more holes 150 that are formed to extend from the base layup 110 and U-shaped layup 140 between the first rib portion 112 and the second rib portion 113 to an interior of one of the pre-densified CMC tubes 120. In this manner, cooling air may be supplied to one or more of the pre-densified CMC tubes for cooling purposes, such as but not limited to film cooling of the CMC BOAS segment 102 or intersegment purge cooling.

The one or more holes 150 may be formed in by machining the components of the preform or by post-densification machining of the densified CMC BOAS segment 102.

Figure 6A:
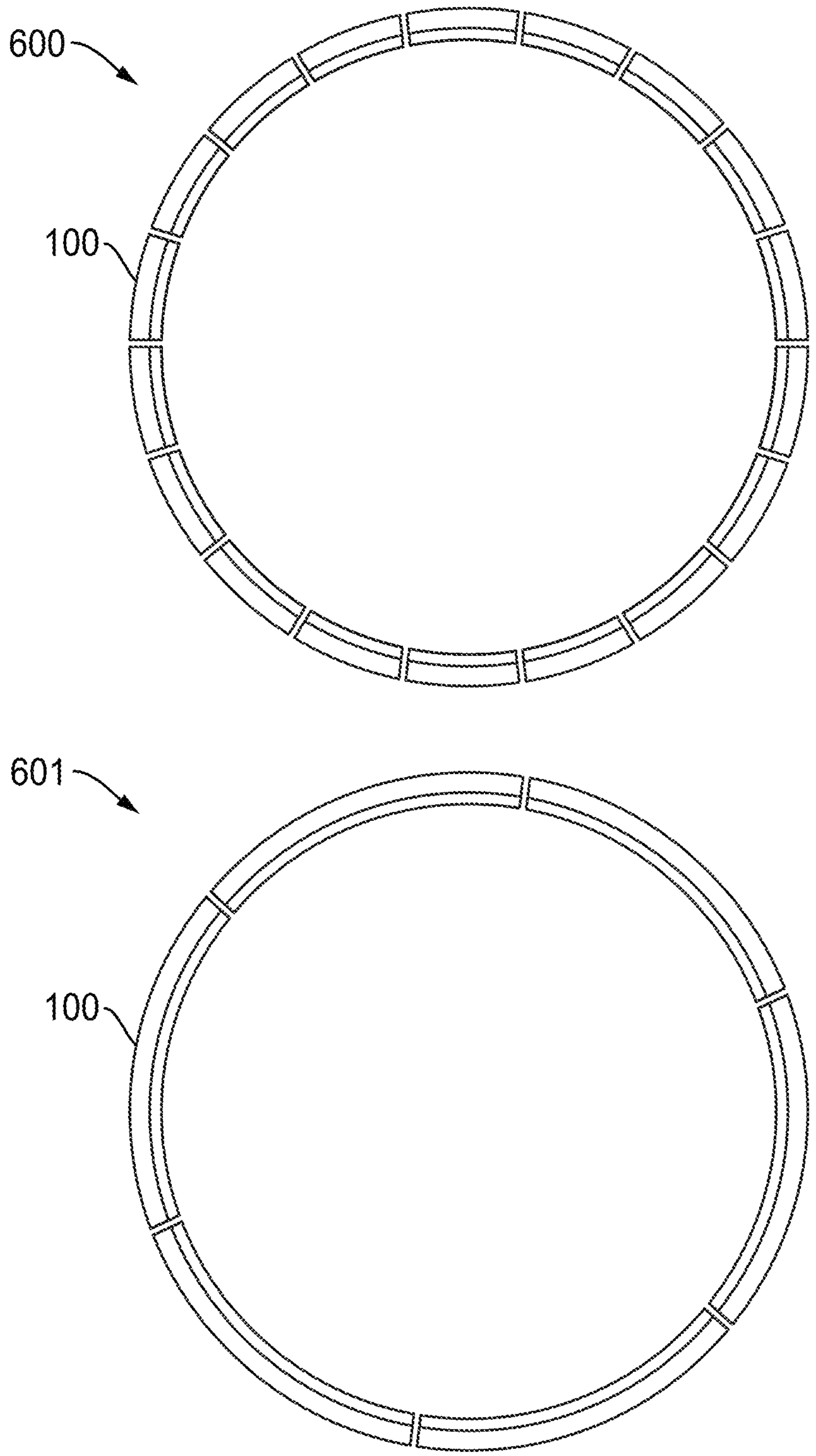
FIG. 6A schematically illustrates an axial view of examples of an 18 segment CMC BOAS wheel and a 6 segment CMC BOAS wheel in accordance with the present disclosure.
Figure 6B:
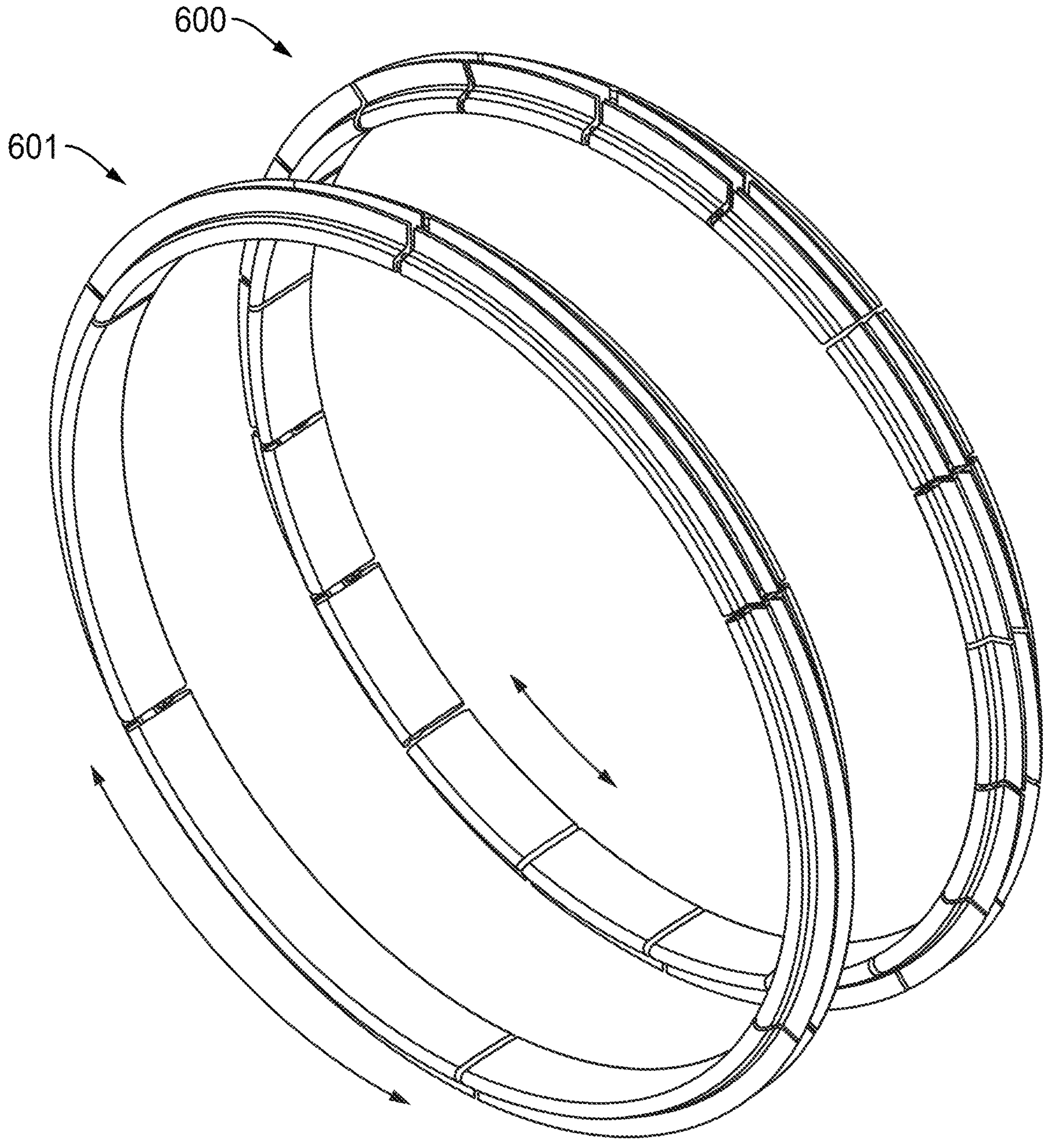
FIG. 6B schematically illustrates a perspective view of examples of an 18 segment CMC BOAS wheel and a 6 segment CMC BOAS wheel in accordance with the present disclosure.

FIGS. 6A and 6B schematically illustrates an axial view and a perspective view, respectively, of examples of an 18 segment CMC BOAS wheel 600 and a 6 segment CMC BOAS wheel 601 in accordance with various example embodiments of the present disclosure.

CMC BOAS 600 wheel is made up of 18 CMC BOAS segments 100, wherein each segment makes up approximately 20 degrees of the 360 degree CMC BOAS wheel 600. However, due the mechanical properties of the present invention, a CMC BOAS wheel 601 may be made of fewer CMC BOAS segments 100. For example, CMC BOAS wheel 601 is made up of 6 CMC BOAS segments 100, wherein each segment makes up approximately 60 degrees of the 360 degree CMC BOAS wheel 601. Advantages of using fewer CMC BOAS segments 100 in CMC BOAS wheel 601 include reduced purge flow usage increasing engine performance, and reduced CMC BOAS wheel 601 cost due to a reduction in the number of CMC BOAS segments 100, and a resultant reduction in associated costs of machining operations and attachment hardware.

Figure 6C:
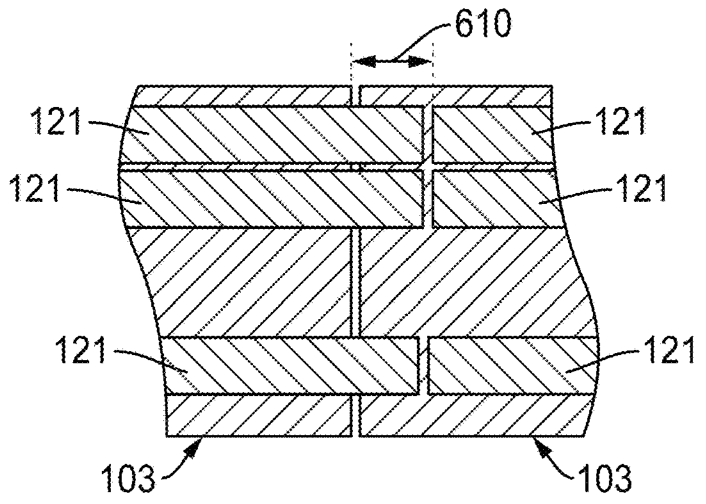
FIG. 6C schematically illustrates a cutaway radial view of CMC BOAS segments having offset tubes in accordance with the present disclosure.

In regard to FIG. 6C, a cutaway radial view of CMC BOAS segments 103 having offset CMC tubes 121 tubes is illustrated in accordance with one or more embodiments of the present disclosure. When the preform for CMC BOAS segments 103 is formed, the CMC tubes 121 in their pre-densified state are offset by a distance 610 so as to extend by the distance 610 from one end and be recessed by the distance 610 at the other end of each CMC BOAS segment 103. In this manner, the CMC tubes 121 may be used to aid in assembly and positioning of the CMC BOAS segments 103. In certain embodiments, the CMC tubes 121 may nest and/or be capable of passing cooling air between CMC BOAS segments 103. In other embodiments, this arrangement may decrease or eliminate intersegment gaps.

Figure 7:
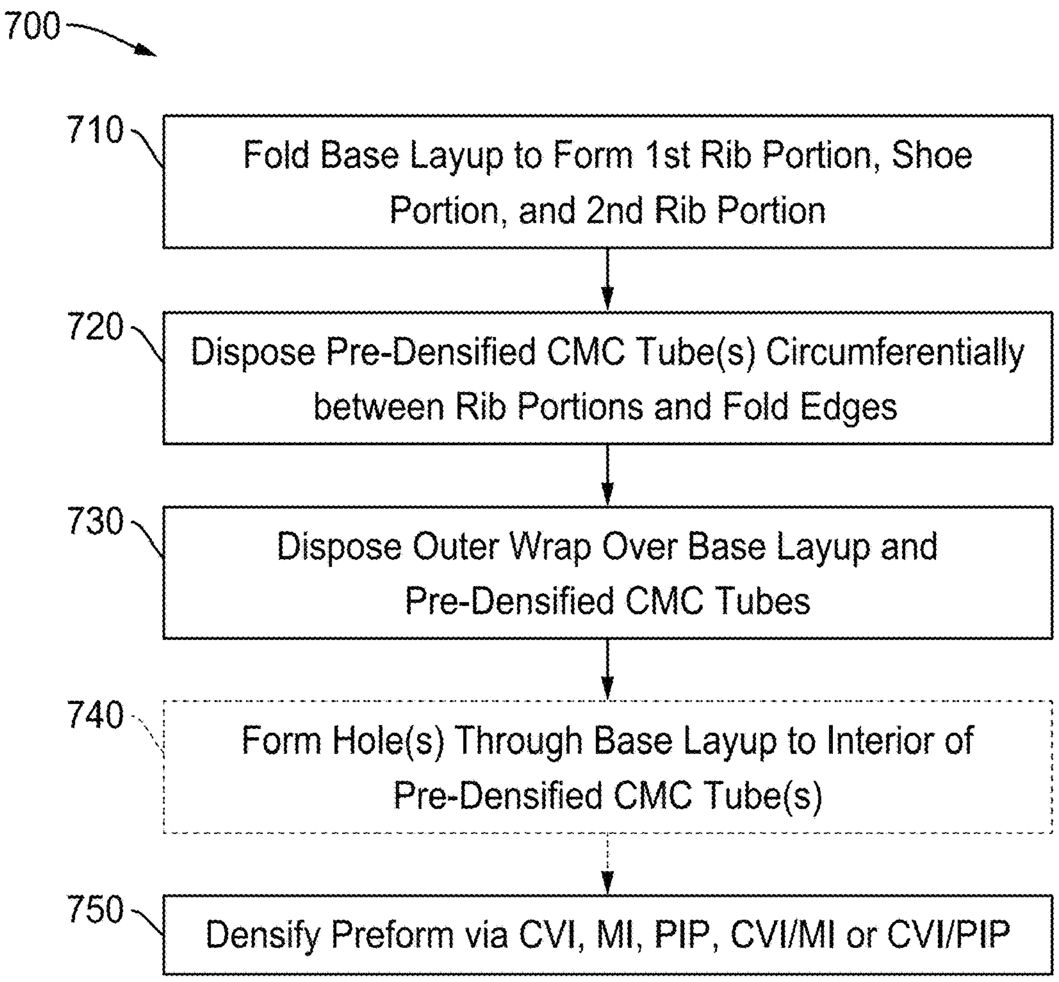
FIG. 7 is a flow diagram of an example process in accordance with the present disclosure.

With regard to FIG. 7, a flow diagram of an example method 700 of forming a CMC BOAS segment in accordance with the present disclosure is illustrated.

In the method 700, a preform is formed, and includes a step 710 of folding a base layup formed of one or more fabric plies to form a first rib portion, a shoe portion having an upstream fold edge and a downstream fold edge, and a second rib portion. In one or more embodiments, ends of the base layup may include L-shaped cuts and the forming the preform further includes intersecting the L-shaped cuts to form a substantially U-shaped cross section forming the first and second rib portions. In other embodiments, forming the preform may further include disposing a substantially U-shaped layup formed of one or more fabric plies circumferentially between the first rib portion and the second rib portion.

A next step 720 in forming the preform in the method 700 includes disposing one or more pre-densified CMC tubes circumferentially between the first rib portion and the upstream fold edge and between the second rib portion and the downstream fold edge, respectively. In one or more embodiments, the pre-densified CMC tubes may have sealed ends. In one or more other embodiments, the pre-densified CMC tubes have flattened non-circular cross sections.

The method 700 also includes step 730, wherein forming the preform includes disposing an outer wrap formed of one or more fabric plies to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion.

In an optional step 740, forming the preform may further include forming one or more holes extending through the base layup between the first and second ribs to an interior of one of the pre-densified CMC tubes. In certain cases, this may also be done after densification of the preform.

In a step 750, the method 700 may further include densifying the preform by Chemical Vapor Infiltration (CVI), Melt Infiltration (MI), Polymer Infiltration and Pyrolysis (PIP), a hybrid of CVI/MI, or a hybrid of CVI/PIP.

In one or more embodiments of the method 700, at least one end of at least one of the pre-densified CMC tubes may be sealed prior to being disposed circumferentially. In one or more other embodiments of the method 700, at least one end of at least one of the pre-densified CMC tubes may be blocked with fabric layup and sealed during the densifying of the preform. In one or more further embodiment of method 700, disposing the one or more pre-densified CMC tubes circumferentially may include offsetting the pre-densified CMC tubes relative to the base layup and the outer wrap.

Embodiments within the present disclosure provide numerous benefits, including but not limited to: (i) providing a sandwich-like structure to a CMC BOAS segment so as to strengthen the bending response thereof; (ii) obtaining better densification of the outer wrap via the open nature of the preform configuration so as to provide a dense, stiff outer region to the CMC BOAS segment; (iii) Adding thickness to the CMC BOAS segment and maintaining desired height in the main thickness thereof; (iv) manufacturing the internal base layup via a folding methodology similar to a single fabric layer wherein the fabric bending can create strong edge regions; and (v) leveraging the open internal architecture of the preform and the pre-densification of the CMC tubes to aid in the overall densification of the CMC BOAS segment.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) blade outer air seal (BOAS) segment, comprising:

a preform having:

a base layup formed of one or more fabric plies folded to form a first rib portion, a shoe portion having an upstream fold edge and a downstream fold edge, and a second rib portion;

one or more pre-densified CMC tubes disposed circumferentially between the first rib portion and the upstream fold edge and between the second rib portion and the downstream fold edge, respectively; and an outer wrap formed of one or more fabric plies disposed to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion, wherein ends of the base layup include L-shaped cuts to allow the ends to intersect and form a substantially U-shaped cross section forming the first and second rib portions.

2. The CMC BOAS segment of claim 1, wherein the preform has been densified by Chemical Vapor Infiltration (CVI), Melt Infiltration (MI), Polymer Infiltration and Pyrolysis (PIP), a hybrid of CVI/MI, or a hybrid of CVI/PIP.

3. The CMC BOAS segment of claim 1, wherein the pre-densified CMC tubes have flattened non-circular cross sections.

4. The CMC BOAS segment of claim 1, wherein one or more holes are formed to extend from the base layup between the first rib portion and the second rib portion to an interior of one of the pre-densified tubes.

5. The CMC BOAS segment of claim 1, wherein an end of one or more of the pre-densified tubes is sealed.

6. The CMC BOAS segment of claim 1, wherein the CMC BOAS segment comprises one sixth of a CMC BOAS wheel.

7. A ceramic matrix composite (CMC) blade outer air seal (BOAS) segment, comprising:

a preform having:

a base layup formed of one or more fabric plies folded to form a first rib portion, a shoe portion having an upstream fold edge and a downstream fold edge, and a second rib portion;

one or more pre-densified CMC tubes disposed circumferentially between the first rib portion and the upstream fold edge and between the second rib portion and the downstream fold edge, respectively; and an outer wrap formed of one or more fabric plies disposed to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion, wherein the one or more pre-densified tubes are circumferentially offset relative to the base layup and the outer wrap.

8. A method of forming a ceramic matrix composite (CMC) blade outer air seal (BOAS) segment, comprising:

forming a preform by:

folding a base layup formed of one or more fabric plies to form a first rib portion, a shoe portion having an upstream fold edge and a downstream fold edge, and a second rib portion;

disposing one or more pre-densified CMC tubes circumferentially between the first rib portion and the upstream fold edge and between the second rib portion and the downstream fold edge, respectively; and disposing an outer wrap formed of one or more fabric plies to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion, wherein ends of the base layup include L-shaped cuts and the method further comprises intersecting the L-shaped cuts to form a substantially U-shaped cross section forming the first and second rib portions.

9. The method of claim 8, further comprising densifying the preform by Chemical Vapor Infiltration (CVI), Melt Infiltration (MI), Polymer Infiltration and Pyrolysis (PIP), a hybrid of CVI/MI, or a hybrid of CVI/PIP.

10. The method of claim 8, wherein forming the preform further comprises forming one or more holes extending through the base layup between the first and second ribs to an interior of one of the pre-densified CMC tubes.

11. The method of claim 8, wherein at least one end of at least one of the pre-densified CMC tubes is sealed prior to being disposed circumferentially.

12. A method of forming a ceramic matrix composite (CMC) blade outer air seal (BOAS) segment, comprising:

forming a preform by:

folding a base layup formed of one or more fabric plies to form a first rib portion, a shoe portion having an upstream fold edge and a downstream fold edge, and a second rib portion;

disposing one or more pre-densified CMC tubes circumferentially between the first rib portion and the upstream fold edge and between the second rib portion and the downstream fold edge, respectively; and disposing an outer wrap formed of one or more fabric plies to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion; and densifying the preform by Chemical Vapor Infiltration (CVI), Melt Infiltration (MI), Polymer Infiltration and Pyrolysis (PIP), a hybrid of CVI/MI, or a hybrid of CVI/PIP, wherein at least one end of at least one of the pre-densified CMC tubes is blocked with fabric layup and sealed during the densifying of the preform.

13. A method of forming a ceramic matrix composite (CMC) blade outer air seal (BOAS) segment, comprising:

forming a preform by:

folding a base layup formed of one or more fabric plies to form a first rib portion, a shoe portion having an upstream fold edge and a downstream fold edge, and a second rib portion;

disposing one or more pre-densified CMC tubes circumferentially between the first rib portion and the upstream fold edge and between the second rib portion and the downstream fold edge, respectively; and disposing an outer wrap formed of one or more fabric plies to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion, wherein disposing the one or more pre-densified CMC tubes circumferentially includes offsetting the pre-densified CMC tubes relative to the base layup and the outer wrap.

14. A method of forming a ceramic matrix composite (CMC) blade outer air seal (BOAS) segment, comprising:

forming a preform by:

folding a base layup formed of one or more fabric plies to form a first rib portion, a shoe portion having an upstream fold edge and a downstream fold edge, and a second rib portion;

disposing one or more pre-densified CMC tubes having sealed ends circumferentially between the first rib portion and the upstream fold edge and between the second rib portion and the downstream fold edge, respectively, wherein the pre-densified CMC tubes have flattened non-circular cross sections;

disposing an outer wrap formed of one or more fabric plies to overwrap the first rib portion, the one or more pre-densified CMC tubes disposed circumferentially between the first rib portion and the upstream fold edge, the upstream fold edge, the downstream fold edge, the one or more pre-densified CMC tubes disposed circumferentially between the second rib portion and the downstream fold edge, and the second rib portion; and forming one or more holes extending through the base layup between the first rib portion and the second rib portion to an interior of one of the pre-densified CMC tubes; and densifying the preform by Chemical Vapor Infiltration (CVI), Melt Infiltration (MI), Polymer Infiltration and Pyrolysis (PIP), a hybrid of CVI/MI, or a hybrid of CVI/PIP, wherein ends of the base layup include L-shaped cuts and the forming the preform further comprises intersecting the L-shaped cuts to form a substantially U-shaped cross section forming the first and second rib portions.

* * * * *